Feb. 23, 1937.    C. O. ROSS    2,071,854
LUBRICANT RETAINER FOR THE SUPPORTING SPRINGS OF VEHICLES
Filed June 21, 1935
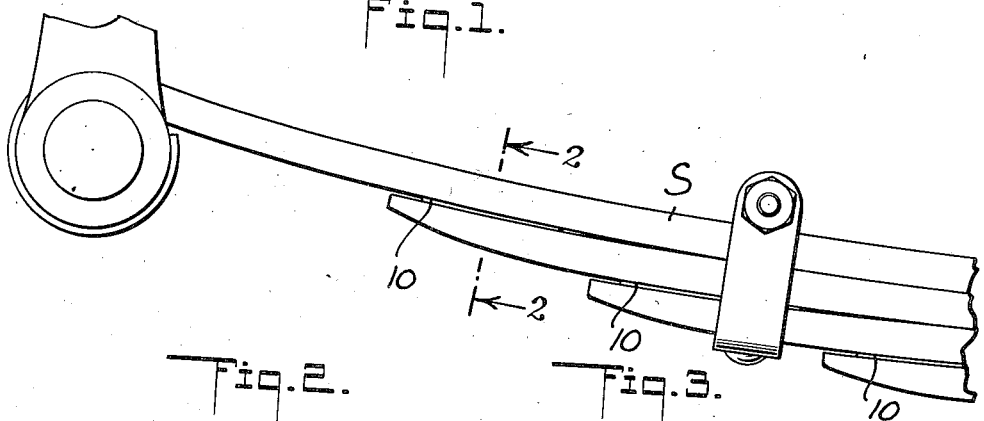
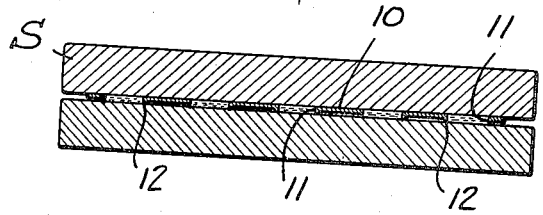
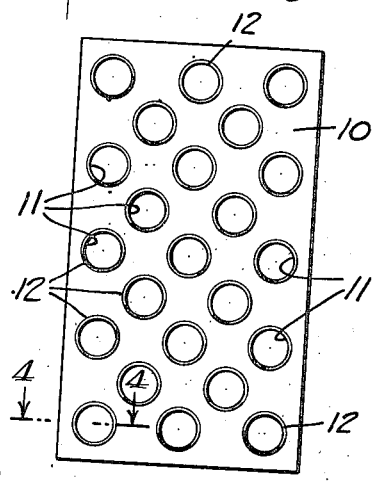
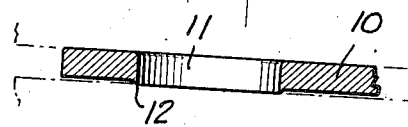
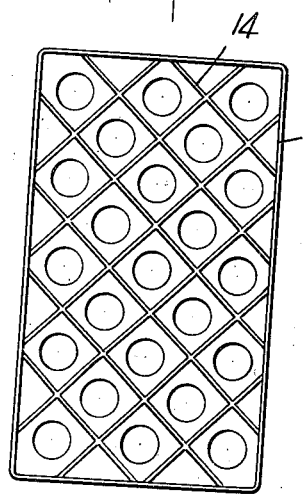
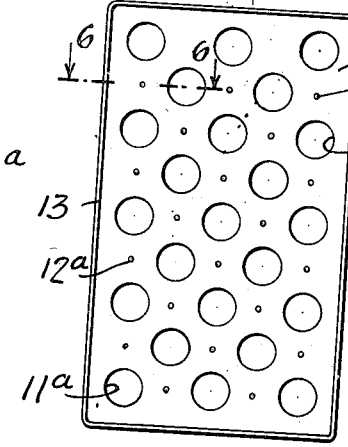
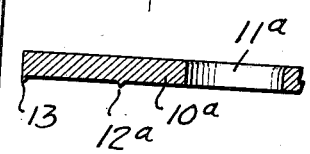
INVENTOR
CLIFFORD O. ROSS
BY
Anderson & Liddy
ATTORNEYS Patented Feb. 23, 1937

2,071,854

UNITED STATES PATENT OFFICE 2,071,854

LUBRICANT RETAINER FOR THE SUPPORTING SPRINGS OF VEHICLES

Clifford O. Ross, Beverly Hills, Calif.

Application June 21, 1935, Serial No. 27,782

3 Claims. (Cl. 267—49)

This invention relates to lubricant retainers for the supporting springs of vehicles, and has for an object the provision of means which can be freely inserted between adjacent leaves of the spring in a manner to expose surfaces thereof for direct contact with a retained quantity of lubricant, whereby to effect better lubrication of the spring than that provided for by others of the devices of the prior art.

Another object is to provide a lubricant retainer which when inserted between the leaves of the spring will be effectively held against accidental displacement from a position of intended adjustment.

A further object is to provide a lubricant retainer which can be struck from a single piece of metal to provide (1) means for holding a charge of lubricant and disposing same for wiping contact with adjacent surfaces of the leaves of the spring, and (2) means for anchoring the plate between said leaves.

Other objects and advantages will be made manifest in the following specification, in which several embodiments of the invention are described and illustrated in the accompanying drawing, in which Figure 1 is a view in elevation of a portion of a leaf spring showing a preferred embodiment of the invention applied thereto;

Figure 2 is a section taken on line 2—2 of Figure 1;

Figure 3 is a bottom plan view of the device removed from the spring;

Figure 4 is a transverse section on line 4—4 of Figure 3, showing the device on an enlarged scale and illustrating same between adjacent leaves of the spring;

Figure 5 is a bottom plan view of a further form of the device;

Figure 6 is a section on line 6—6 of Figure 5;

Figure 7 is a bottom plan view of a further form of the device.

In the form of the device illustrated in Figures 1 to 4, inclusive, of the drawing, same is used in connection with vehicle supporting springs S, the leaves of which are, respectively, of graduated lengths and secured to each other intermediate the ends thereof. The device consists of a thin metallic plate 10 of substantially uniform thickness throughout, the same having a plurality of apertures 11 extending transversely therethrough. These apertures thus open onto the respective sides of the plate and each said aperture is designed to hold a charge of lubricant such as is commonly used as a lubricant for the leaves of said spring. The apertures are struck from the plate by means of a punch of any suitable well known form whereby in the punching operation portions of the wall surfaces of the apertures will be drawn in a direction axially of the aperture, to thus provide each aperture with a circular sharp-edged barb 12, the purpose of which will appear presently.

As previously stated, the plate 10 is of thin gauge metal. That is to say, the thickness of 10 the plate is considerably less than that of any one of the leaves of the spring S, yet sufficient to give ample depth to the apertures 11 to enable them to receive and hold a charge or quantity of lubricant which can be utilized to maintain the spring leaves in a lubricated condition.

In practice, as many of the plates 10 can be employed as desired; in Figure 1 of the accompanying drawing, in which approximately one-half of a supporting spring is shown, two such plates are employed, each placed flatwise between adjacent ones of the spring leaves and disposed with the barbs 12 extending downwardly where they can firmly engage the upper surface of the lower one of the two leaves between which the plate is disposed, the under surface of the upper one of said two leaves bearing substantially flatwise against the upper face of said plate. By reason thereof, the barbs bite into said lower one of the leaves and penetrate the metal thereof sufficiently to secure the plate in a firm position of intended adjustment and to seal the lubricant charges from downward loss from said apertures.

The spring can be lubricated in the customary manner and the apertures 11 filled with lubricant. When the plates are placed between the spring leaves as above described, the lubricant contained in the apertures will be drawn upon in the ordinary use of the spring and same will be gradually displaced from said apertures for intended distribution to the confronting surfaces of said leaves. This is made possible by reason both of capillary attraction and by reason of a slight pumping of the lubricant from the apertures induced by movement of the leaves relative to said plates.

In the form shown in Figures 5 and 6, the plate 10a has formed therein suitable lubricant holding apertures 11a and struck from the plates are anchoring or retaining barbs 12a, the latter functioning like barb 12 to secure the plate between the companion leaves of the spring. In addition thereto, the plate is formed with a marginal sharp edge 13 of the same depth as the barbs, the same functioning to prevent escape of the lubricant from beneath the plate when the latter is inserted between the leaves of the spring.

In Figure 7, the plate is substantially like the plate shown in Figures 5 and 6, and same is formed with a marginal sharp edge 13a and diagonal sharp edges 14.

In either form of the invention, the apertures for holding the lubricant can be placed in any desired manner, but in order to maximize distribution of the lubricant to the spring surfaces, it is preferred that they be relatively staggered.

It is to be understood that the metal from which the device is formed should be harder than the metal from which the spring is formed, whereby to enable the retaining barbs of the device to have anchoring purchase with the spring as set forth.

What is claimed is:

1. A lubricant retainer for vehicle springs of the type employing resilient metallic leaves disposed one on top of the other, comprising a plate of thin gage metal of greater hardness than the material of said leaves and adapted for flatwise insertion between a pair of said leaves, one side of the plate being more or less perfectly smooth and the other side having means thereon adapted to penetrate the material of one leaf of said pair to secure the plate in a position of relatively fixed application between said pair of leaves, with said smooth side of the plate in flat contact with the leaf which confronts it, the plate having one or more apertures passing therethrough from one side thereof to the other and adapted to contain lubricant and enable same to pass therefrom at the smooth side of the plate for distribution thereof to an adjacent surface of said confronting leaf, the aforestated penetrating means coacting with said aperture or apertures to provide a barrier upon the plate adapted to prevent escape of the lubricant from the opposite side of the plate, said retaining means including continuous sharp edged portions upstruck directly from said plate, around each of said openings, and having a solid bearing formed by directly opposite material of the plate at the smooth side thereof.

2. A lubricating device for vehicle springs of the type employing resilient metallic leaves, disposed one on top of the other, comprising a substantially flat plate of thin gauge metal of greater hardness than the metal of said leaves and adapted for lateral insertion between the leaves so that one side of the plate faces a confronting face of one leaf and the other side is correspondingly related to the confronting face of the other leaf; the plate being of short length as compared to length of said spring leaves and being of a width substantially coextensive with the width of said leaves; and barbs struck from the plate for penetrating the metal of a correlated spring leaf so as to hold the plate firmly secured to said leaf and for maintaining flat contact of the opposite side of the plate with the correlated leaf, the surface of which confronts said opposite side of the plate; the striking of the barbs from the plate being done in such manner as to provide the plate with a multiplicity of transverse rows of lubricant-retaining openings passing entirely through the plate and disposed relative to each other so that the openings co-act with each other to rub portions of lubricant from zones bounded by certain of the openings toward zones bounded by others of the openings during relative longitudinal movement of said spring leaves during flexure of the spring.

3. A lubricating device for vehicle springs of the type employing resilient metallic leaves, disposed one on top of the other, comprising a substantially flat plate of thin gauge metal of greater hardness than the metal of said leaves and adapted for lateral insertion between the leaves so that one side of the plate faces a confronting face of one leaf and the other side is correspondingly related to the confronting face of the other leaf; the plate being of short length as compared to length of said spring leaves and being of a width substantially coextensive with the width of said leaves; the plate having openings therethrough for the reception of lubricant, and the edge of such openings at one side of the plate forming a substantially abrupt corner to provide a solid bearing of the plate against a spring leaf to the wall of the openings; and barbs projecting from the opposite side of the plate around the edge of the openings so as to be rigidly supported against bending or crushing into the plane of said opposite side of the plate by the solid bearing of the abrupt corner forming edge at the first mentioned side of the plate, whereby to insure that the barbs will penetrate the metal of the confronting spring leaf under the pressure imposed on the plate by the spring.

CLIFFORD O. ROSS.